United States Patent
Corlay et al.

(10) Patent No.: US 12,537,725 B2
(45) Date of Patent: Jan. 27, 2026

(54) METHOD, TRANSMITTER AND RECEIVER IN COMMUNICATION SYSTEM

(71) Applicant: Mitsubishi Electric Corporation, Tokyo (JP)

(72) Inventors: Vincent Corlay, Rennes (FR); Damien Castelain, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 12 days.

(21) Appl. No.: 18/705,300

(22) PCT Filed: Jun. 8, 2022

(86) PCT No.: PCT/JP2022/023872
§ 371 (c)(1),
(2) Date: Apr. 26, 2024

(87) PCT Pub. No.: WO2023/119692
PCT Pub. Date: Jun. 29, 2023

(65) Prior Publication Data
US 2025/0227010 A1   Jul. 10, 2025

(30) Foreign Application Priority Data
Dec. 23, 2021 (EP) .................................. 21306924

(51) Int. Cl.
*H04L 25/03* (2006.01)
*H04B 7/185* (2006.01)
*H04L 27/36* (2006.01)

(52) U.S. Cl.
CPC ... *H04L 25/03343* (2013.01); *H04B 7/18513* (2013.01); *H04L 27/368* (2013.01)

(58) Field of Classification Search
CPC ............ H04L 25/03343; H04L 27/368; H04B 7/18513
See application file for complete search history.

(56) References Cited

U.S. PATENT DOCUMENTS

| | | | |
|---|---|---|---|
| 8,767,869 B2* | 7/2014 | Rimini ..................... | H04B 1/30 375/267 |
| 11,196,459 B2* | 12/2021 | Noda ................ | H04L 25/03057 |
| 12,003,225 B2* | 6/2024 | Enzinger ............ | H03H 21/0012 |

OTHER PUBLICATIONS

Gregorio et al., "Receiver-side nonlinearities mitigation using an extended iterative decision-based technique" Signal Processing, Aug. 1, 2011, vol. 91, No. 8, p. 2042-2056.

(Continued)

*Primary Examiner* — Dac V Ha
(74) *Attorney, Agent, or Firm* — Birch, Stewart, Kolasch & Birch, LLP (57) ABSTRACT

A method in a communication system comprising a transmitter and a receiver communicating through a communication channel comprises:
  Obtaining a first received sequence corresponding to the transmission of a first pilot sequence by the transmitter to the receiver;
  Estimating r responsive to the first pilot sequence and the first received sequence, r being equal to the convolution of a first linear filter and a second linear filter;
  Determining a plurality of candidates for the first linear filter responsive to the estimated r̂;
  Obtaining a second received sequence corresponding to the transmission of a second pilot sequence by the transmitter to the receiver; and
  Determining the non-linear function and selecting one candidate for the first linear filter among the plurality of candidates responsive to the second pilot sequence and the second received sequence.

16 Claims, 6 Drawing Sheets

(56) References Cited

OTHER PUBLICATIONS

Li et al., "Parameter estimation of Hammerstein-Wiener nonlinear system with noise using special test signals", Neurocomputing, Jan. 1, 2019, vol. 344, p. 37-48.

Taringou et al., "Behaviour modelling of wideband RF transmitters using Hammerstein-Wiener models", IET Circuits, Devices and Systems, Jul. 22, 2010, vol. 4, No. 4, p. 282-290.

\* cited by examiner

METHOD, TRANSMITTER AND RECEIVER IN COMMUNICATION SYSTEM

TECHNICAL FIELD

At least one of the present embodiments generally relates to a method in a communication system, the communication system comprising a transmitter and a receiver communicating through a communication channel. The communication channel being modeled as a succession of a first linear filter, a non-linear function and a second linear filter, the method is for determining the first linear filter, the non-linear function and the second linear filter. At least one of the present embodiments also relates to a device, e.g., a transmitter or a receiver, configured to implement the method.

BACKGROUND ART

Figures 1, 2:
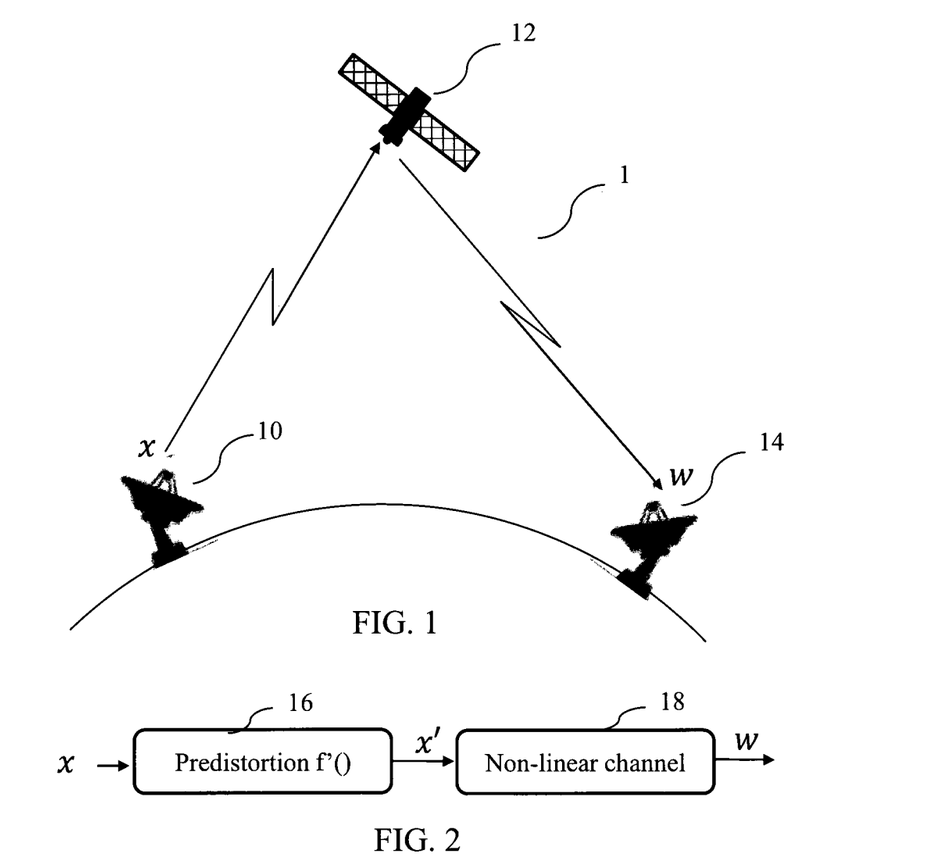
FIG. 1 depicts a satellite communication system.
FIG. 2 illustrates the principles of signal predistortion.

In a communication system, a transmitter is coupled to a receiver by way of a communication channel. The transmitter usually comprises an encoder configured to encode the input data into symbols. These symbols are then transmitted over the communication channel to the receiver. The receiver comprises a decoder configured to decode the received symbols into output data. In case of satellite communications, the communication channel comprises a satellite transponder. FIG. 1 depicts such a satellite communication system 1 comprising a transmitter 10, e.g. a base station such as a TV station, a satellite transponder 12 and a receiver 14, e.g. a TV receiver. The transmitter 10 is configured to transmit signals (uplink communication) to the satellite transponder 12 which in turns transmits the signals after amplification (downlink communication) to the receiver 14. For amplifying the signal, the satellite transponder comprises a High Power Amplifier, also known as HPA. Such an amplifier introduces non-linearities especially when driven close to saturation which is often the case for efficiency reasons. Spectral spreading or regrowth and in-band distortion are examples of the effects of such non-linear distortions that degrade the overall performances of the satellite communication system.

In order to compensate for these effects due to non-linearities introduced by the HPA, a well-known approach comprises pre-distorting the signal transmitted by the transmitter 10. Therefore, as depicted on FIG. 2, the transmitter 10 instead of directly transmitting the signal x, applies a predistortion function f'( ) on the signal x and sends the signal x' so that a signal w=f(x') is received by the receiver 14, wherein w is very close to the signal x. The objective of applying the predistortion function f'( ) is to modify the input x so that the output x' when processed by the nonlinear system approximates a desired response that is free of nonlinear distortion. In order to define the predistortion function f'( ) there is a need to model the non-linear channel 18. For instance, as disclosed in section 3.2.3 of the thesis of N. Alibert entitled "*Iterative predistortion algorithms adapted to the increasing throughput of satellite Communications*", a direct learning architecture (DLA) adapts the predistortion based on a prior identification of the channel. With DLA a prior identification of the channel is used in order to adapt the predistortion function f'( ).

Figure 3:
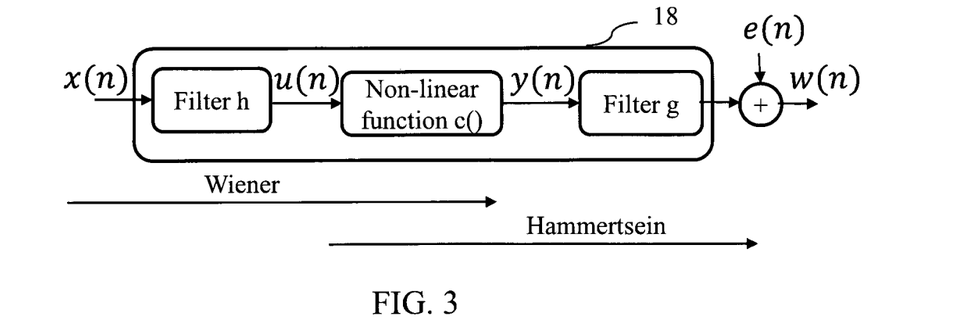
FIG. 3 depicts a non-linear channel modelled by a Wiener-Hammerstein model.

Classically, the non-linear channel 18 is modelled using a Wiener-Hammerstein model as depicted on FIG. 3. The Wiener-Hammerstein model directly applies to the satellite transponder since it matches its description. A Wiener-Hammerstein model comprises three elements: a first linear filter h of length $L_1$, a non-linear function c( ) and a second linear filter g of length $L_2$. A commonly used representation of the Wiener-Hammerstein model is the Volterra model. The Volterra model does not represent each of the three elements h, c and g individually but it represents directly the result of the application of the three elements. This model can be written as a matrix operation $w(n)=Q \cdot \Phi_n(x)$, where Q is a kernel vector and $\Phi_n( )$ is an operator which computes a nonlinear combination of the input vector x. On the one hand, using the Volterra model is convenient as a least square algorithm may be used to estimate the vector Q, i.e. $Q=(\Phi_n(x)^H \Phi_n(x))^{(-1)} \Phi_n(x)^H w$. On the other hand, this solution has the drawback of generating a very high number of coefficients. For instance, if c(.) is modelled by a polynomial of order K, the vector Q has a length greater than $L_2 * (L_1)^K$. Having such a high number of coefficients is an issue both for the estimation and inference stages: Regarding the estimation of the coefficients, it induces a high complexity to invert the matrix $\Phi_n(x)^H \Phi_n(x)$ and requires a long training sequence x. For the inference stage (e.g., predistortion), the transmitter should use this model for each sequence to be pre-distorted which thus involves a high computational complexity.

It is thus desirable to find a method for estimating the non-linear channel that is less complex than the method based on the Volterra model.

SUMMARY OF INVENTION

At least one of the present embodiments generally relates to a method in a communication system comprising a transmitter and a receiver communicating through a communication channel comprising a high power amplifier, e.g. in a satellite transponder. The communication channel is modeled as a succession of a first linear filter of size L1, a non-linear function and a second linear filter of size L2, L1 and L2 being positive integers. The method comprises:

a) Obtaining a first received sequence w1 corresponding to the transmission of a first pilot sequence x1 by the transmitter to the receiver, the first pilot sequence being such that the output of the first linear filter obtained with the first pilot sequence as input has a low peak amplitude with respect to a saturation level of the high power amplifier or a high peak amplitude with a low frequency;

b) Estimating r responsive to the first pilot sequence and the first received sequence, r being equal to the convolution of the first and the second linear filters;

c) Determining a plurality of candidates for the first linear filter responsive to the estimated r̂;

d) Obtaining a second received sequence w2 corresponding to the transmission of a second pilot sequence x2 by the transmitter to the receiver, the second pilot sequence being such that the output of the first linear filter obtained with the second pilot sequence as input has a high peak amplitude with respect to the saturation level of the high power amplifier; and e) Determining the non-linear function and selecting one candidate for the first linear filter among the plurality of candidates responsive to the second pilot sequence and the second received sequence, the second linear filter being uniquely determined from the selected one candidate for the first linear filter.

Advantageously, the method makes it possible to estimate and simulate the non-linear channel with a lower number of coefficients than with the Volterra model. Consequently, the complexity of a predistortion at the transmitter side may be decreased.

In a specific embodiment, the first pilot sequence belongs to a codebook of first pilot sequences and the method further comprises, after step b), comparing an error $\|w_1-\hat{r}*x_1\|$ with a threshold value and going back to step a) with a next first pilot sequence of the codebook in the case where $\|w_1-\hat{r}*x_1\|$ is above a threshold value and continuing to step c) otherwise.

In a specific embodiment, estimating r responsive to the first pilot sequence x1 and the first received sequence w1 comprises determining $\hat{r}$ as follows using a least square method:

$$\hat{r} = \left(x_1^H x_1\right)^{(-1)} x_1^H w_1$$

where $x_1^H$ denotes the conjugate transpose of $x_1$.

In a specific embodiment, determining a plurality of candidates for the first linear filter responsive to the estimated $\hat{r}$ comprises:
transforming $\hat{r}$ into the z-domain into R(z);
determining the roots of R(z); and
factorizing R(z) into a plurality of products H(z)G(z), with each H(z) being a combination of L1 roots of R(z) among the roots of R(z), each H(z) corresponding to one candidate for the first linear filter.

In a specific embodiment, the non-linear function c( ) being defined as follows: $c(u_i(n))=\Sigma_{k=1}^{K}\gamma(k)u_i^k(n)$, where K is a positive integer, determining the non-linear function and selecting one candidate for the first linear filter among the plurality candidates responsive to the second pilot sequence and the second received sequence comprises:
for each candidate hi of the first linear filter:
computing a corresponding second linear filter gi from H(z) and hi and computing ui=x2*hi, where * is a convolution operator;
determining $g'^i$ using a least square method as follows:

$$g'^i = \left(\phi(u_i)^H\phi(u_i)\right)^{(-1)}\phi(u_i)^H w_2,$$

where $\phi(u_i)=[u_i, u_i^2, \ldots, u_i^K]$
determining $\gamma_i$ from $g'^i$ and $g_i$ wherein for each integer j in the range [1;K]:

$$\gamma_i'(j) = \left(\frac{g_j'^i(1)}{g_i(1)} + \ldots + \frac{g_j'^i(L_2)}{g_i(L_2)}\right)/L_2$$

computing $w_{2,i}$ from hi and $\gamma_i$ as follows: $w_{2,i}=c_i(x1*hi)*gi$;
selecting a pair (hi, $\gamma$i) leading to a smallest value $\|w_{2,i}-w_2\|$.

At least one of the present embodiments generally relates to a predistortion method comprising:
determining a first linear filter, a non-linear function and a second linear filter according to the method of any one of claims 1 to 6; and
adapting a predistortion function from said first linear filter, said non-linear function and said second linear filter.

At least one of the present embodiments generally relates to a transmitting method comprising predistorting a signal to a transmitting method comprising predistorting a signal by applying a predistortion function before transmission, wherein the predistortion function is adapted according to the predistortion method.

At least one of the present embodiments generally relates to a transmitter in a communication system comprising a receiver, the transmitter and the receiver communicating through a communication channel comprising a high power amplifier, e.g. in a satellite transponder. The communication channel is modeled as a succession of a first linear filter of size L1, a non-linear function and a second linear filter of size L2, L1 and L2 being positive integers. The transmitter is configured to:
a) Obtain a first received sequence w1 corresponding to the transmission of a first pilot sequence x1 by the transmitter to the receiver, the first pilot sequence being such that the output of the first linear filter obtained with the first pilot sequence as input has a low peak amplitude with respect to a saturation level of the high power amplifier or a high peak amplitude with a low frequency;
b) Estimate r responsive to the first pilot sequence x1 and the first received sequence w1, r being equal to the convolution of the first and the second linear filters;
c) Determine a plurality of candidates for the first linear filter responsive to the estimated $\hat{r}$;
d) Obtain a second received sequence w2 corresponding to the transmission of a second pilot sequence x2 by the transmitter to the receiver, the second pilot sequence being such that the output of the first linear filter obtained with the second pilot sequence as input has a high peak amplitude with respect to the saturation level of the high power amplifier; and
e) Determine the non-linear function and selecting one candidate for the first linear filter among the plurality of candidates responsive to the second pilot sequence x2 and the second received sequence w2, the second linear filter being uniquely determined from the selected one candidate for the first linear filter.

At least one of the present embodiments generally relates to a receiver in a communication system comprising a transmitter, the transmitter and the receiver communicating through a communication channel comprising a high power amplifier, e.g. in a satellite transponder. The communication channel is modeled as a succession of a first linear filter of size L1, a non-linear function and a second linear filter of size L2, L1 and L2 being positive integers. The receiver is configured to:
a) Obtain a first received sequence w1 corresponding to the transmission of a first pilot sequence x1 by the transmitter to the receiver, the first pilot sequence being such that the output of the first linear filter obtained with the first pilot sequence as input has a low peak amplitude with respect to a saturation level of the high power amplifier or a high peak amplitude with a low frequency;
b) Estimate r responsive to the first pilot sequence x1 and the first received sequence w1, r being equal to the convolution of the first and the second linear filters;
c) Determine a plurality of candidates for the first linear filter responsive to the estimated $\hat{r}$;
d) Obtain a second received sequence w2 corresponding to the transmission of a second pilot sequence x2 by the transmitter to the receiver, the second pilot sequence being such that the output of the first linear filter obtained with the second pilot sequence as input has a high peak amplitude with respect to the saturation level of the high power amplifier; and
e) Determine the non-linear function and selecting one candidate for the first linear filter among the plurality of candidates responsive to the second pilot sequence x2 and the second received sequence w2, the second linear filter being uniquely determined from the selected one candidate for the first linear filter.

At least one of the present embodiments generally relates to a computer program product comprising program code instructions that can be loaded in a programmable device, the program code instructions causing implementation of the method according to any one of the previous embodiments when the program code instructions are run by the programmable device.

At least one of the present embodiments generally relates to a storage medium storing a computer program comprising program code instructions, the program code instructions causing implementation of the method according to any one of the previous embodiments when the program code instructions are read from the storage medium and run by a programmable device.

The characteristics of the invention will emerge more clearly from a reading of the following description of at least one example of embodiment, said description being produced with reference to the accompanying drawings.

DESCRIPTION OF EMBODIMENTS

The present embodiments may be implemented in a communication system such as the satellite communication system 1 depicted on FIG. 1. The following embodiments disclosed with respect to a satellite communication system may apply to other types of communication systems wherein a transmitter and a receiver communicate through a communication channel comprising a high power amplifier. The communication channel is modeled as a succession of a first linear filter, a non-linear function and a second linear filter. Alternatively, the succession of a first linear filter, a non-linear function and a second linear filter does not model the whole communication channel but only a high power amplifier with memory.

Following the notations of FIG. 3, we let x=[x(1) . . . x(n) . . . x(N)] be an input sequence of length N, where N is a positive integer, u=[u(1) . . . u(n) . . . u(N)] the signal at the output of the first linear filter h of length $L_1$, y=[y(1) . . . y(n) . . . y(N)] the signal at the output of the non-linear function c(.), and w=[w(1) . . . w(n) . . . w(N)] the signal at the output of the second linear filter g of length $L_2$ which is also the output of the complete channel. The output of the first linear filter h is u(n) where:

$$u(n) = \sum_{i=0}^{L_1-1} h(i)x(n-i).$$

The non-linear function can be modelled as a polynomial of order K as follows:

$$y(n) = c(u(n)) = \sum_{k=1}^{K} \gamma(k) u^k(n) \qquad \text{(Eq. 1)}$$

Moreover, assuming that this function is linear when the amplitude $\|u(n)\|$ is small enough, i.e. /u(n)/<μ, c(u(n)) can be rewritten as follows:

$$c(u(n)) = \gamma(1)u(n) \text{ if } |u(n)| < \mu.$$

This assumption holds as most amplifiers HPA exhibit a linear amplifying characteristic when the amplitude of the input signal is not too high, i.e. is inferior to a threshold value μ. The value μ depends on the HPA used. As an example, the "Input Back-Off" (IBO) is often taken as the difference between the amplifier's saturation level and μ. In some cases, the characteristic with small amplitude may only be quasi-linear in which case c(u(n))=γ(1)u(n)+ϵ, meaning that the impact of the residual non-linearity is treated as a noise term ϵ.

When the amplitude $\|u(n)\|$ is small enough, e.g., /u(n)/<μ, the signal is said to have a low peak amplitude.

The output of the second linear filter g is $\Sigma_{i=0}^{L_2-1}$ g(i)y(n−i).

Finally, the output of the system is w(n)=e(n)+$\Sigma_{i=0}^{L_2-1}$ g(i)y(n−i) where e(n) is a noise, i.e. a white noise. In the following the noise e(n) is neglected, i.e. w(n)=$\Sigma_{i=0}^{L_2-1}$ g(i)y(n−i).

Figure 4A:
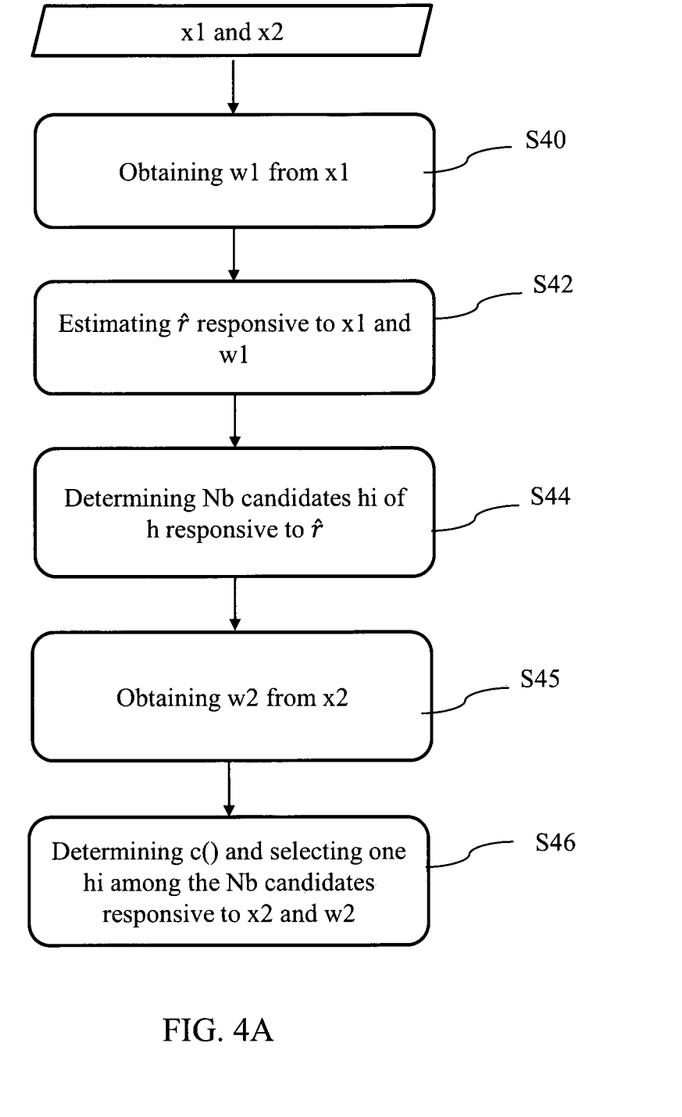
FIG. 4A depicts a method for estimating the linear filters and the nonlinear function of the Wiener-Hammerstein model according to a specific embodiment.

FIG. 4A depicts a flowchart of a method for estimating the filters, i.e. h and g, and the nonlinear function c( ) of Wiener-Hammerstein model according to a specific embodiment.

In a step S40, the transmitter 10 sends a first pilot sequence $x_1$ and the receiver 14 receives a first sequence w1. The first pilot sequence $x_1$ of length N is chosen such that u=$x_1$*h has low peak amplitude, i.e. such that u has a peak amplitude lower than a value μ or at least such that u exceeds μ with low frequency. Using a first pilot sequence of low peak amplitude makes it possible to avoid, at least partly, the non-linear part of the amplifier. In one embodiment, $x_1$ is wideband in order to identify the relevant spectrum of h.

The first pilot sequence $x_1$ can for instance be chosen as a sum of K sinusoids such as:

$$x_1(n) = \sum_{k=1}^{K} \sqrt{\frac{p_k}{2}} \cos f\left(2\pi \frac{k*n}{T} + \theta_k\right),$$

in the case of real signals or $$x_1(n) = \sum_{k=1}^{K} \sqrt{\frac{p_k}{2}} \exp f\left(2\pi \frac{k*n}{T} + \theta_k\right)$$

in the case of complex signals where $p_k$ is the power associated with the sinusoid of index k, $\theta_k$ is the phase and T is the period of the periodic signal $x_1$.

The phase $\theta_k$ is chosen such that the peak amplitude is minimized. For real signals, determining the phase $\theta_k$ can be done for instance as disclosed in the document from Schroeder entitled "*Synthesis of low-peak-factor signals and binary sequences with low autocorrelation*" published in IEEE Trans. Inf. Theo., Vol 16, No 1, January 1970. This document considers the problem of how to adjust the phase angle of a periodic signal with a given power spectrum to minimize its peak-to-peak amplitude. A formula for the phase angles is thus derived that yields generally low peak factors. For complex signals, determining the phase $\theta_k$ can be done as disclosed in the document from Chu entitled "*Polyphase codes with good periodic correlation properties*" published in vol. 18, no. 4, pp. 531-532, July 1972. If the filter h has a linear phase, the peak amplitude of u is the same as the one of $x_1$.

In another embodiment, the first pilot sequence $x_1$ can for instance be chosen as a pseudo white random pilot sequence.

In the following, r is defined as the convolutional product of the filter h and g, i.e. r=h*g. In order to obtain an estimate the linear filter r with a given accuracy the length N of the sequence $x_1$ may be determined, for example, as disclosed in the document from Rabiner et al. entitled "*FIR System Modeling and Identification in the Presence of Noise and with Band-Limited Inputs*" published in August 1978. In this document, the quality of the estimate is assessed via the following Q measure:

$$Q = 10\log_{10} \frac{\sum_{n=0}^{L_1+L_2-1} \Delta r^2(n)}{\sum_{n=0}^{L_1+L_2-1} r^2(n)},$$

where $\Delta r^2(n) = (r(n) - \hat{r}(n))$, with $\hat{r}(n)$ the coefficients of the estimated filter.

With a least square method, the Q measure can be approximated as follows $$Q = 10\log_{10} \frac{L_1 + L_2 - 1}{N} - SNR,$$

with the SNR in dB. Therefore, $$N = (L1 + L2 - 1) * 10^{-\left(\frac{Q+SNR}{10}\right)}.$$

The SNR is the ratio between the average power of the signal x1 and the average power of the signal e(n). Q is fixed by the user. The quality of the channel estimation depends on the value of Q.

In a step S42, the linear filter r=h*g is estimated responsive to x1 and w1 using a least square method. More precisely, the impulse response of the filter r is estimated using the least square method as follows:

$$\hat{r} = (x_1^H x_1)^{(-1)} x_1^H w_1$$

where $x_1^H$ denotes the conjugate transpose of $x_1$, i.e. $x_1^H = \overline{x_1}^T$. In the case where $x_1$ is real, then $x_1^H$ is simply the transpose of $x_1$.

In a step S44, given the estimated filter $\hat{r}$, Nb candidates $h_i$ are computed for h, where Nb is a positive integer. The maximum number of candidates $Nb_{max}$ is given by the binomial coefficient $$\binom{L_1 + L_2}{L_1}.$$

In the z-domain, R(z)=H(z)G(z). Consequently, the roots of the polynomial R(z) come either from H(z) or G(z). As a result, H(z) is obtained from one of the combinations of $L_1$ roots among the $L_1+L_2$ roots of R(z).

Figure 5:
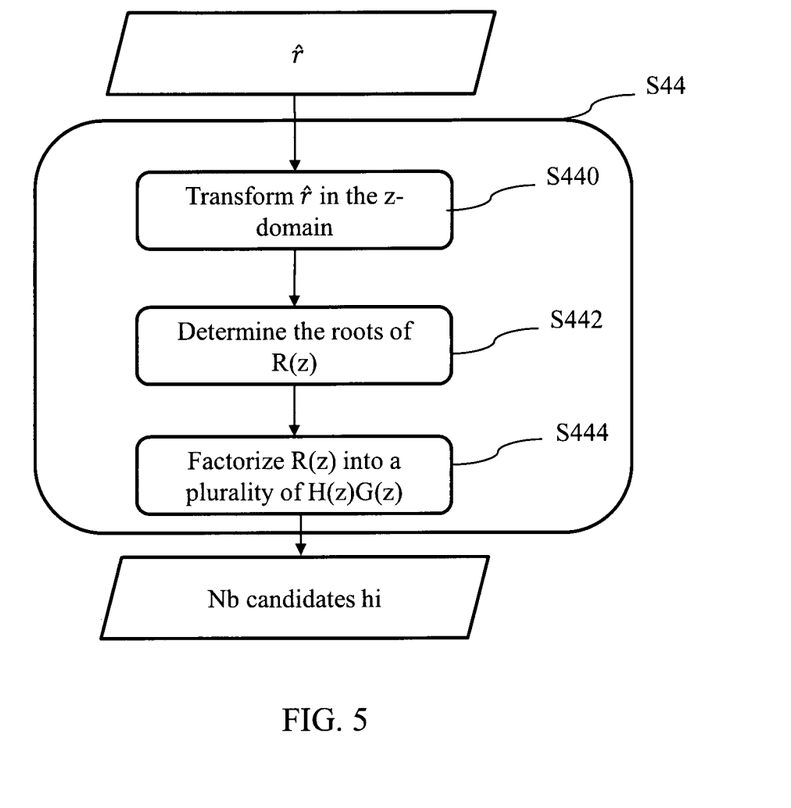
FIG. 5 depicts a flowchart detailing a step of the method of FIG. 4A or 4B according to a specific embodiment.

This step is detailed on FIG. 5. In a step S440, $\hat{r}$ is transformed into R(z) by applying the z-transform, i.e. $R(z)=Z(\hat{r})$. The roots of R(z) are determined in a step S442. In a step S444, R(z) is factorized into products H(z)G(z). Indeed, a plurality of factorizations into H(z)G(z) are possible wherein each H(z) is obtained from L1 roots of R(z) among the L1+L2 roots of R(z). Each H(z) thus obtained corresponds to one candidate for the first linear filter.

As an example, considering the roots z1 and z2, H(z)= $(z-z1)(z-z2)=z^2-(z1+z2)*z+z1*z2$. In this case, the coefficients of the candidate filter $h_i$ are [1; z1+z2; z1*z2]. To each candidate $h_i$ corresponds a unique $g_i$. Indeed, in the case where R(z)=(z-z1)(z-z2)(z-z3)(z-z4), once H(z) is set to be equal to (z-z1)(z-z2), then G(z)=(z-z3)(z-z4). Therefore, the coefficients of the filter $g_i$ are [1; z3+z4; z3*z4].

In a specific embodiment, a priori information on the filter h is considered to reduce the number of candidates, i.e. Nb<$Nb_{max}$. For instance, the following information may be used:

whether the estimated filter h is a low-pass filter or a high-pass filter; and the symmetry of the complex roots of the filter.

Indeed, if the estimated filter h is known to be a low-pass filter or a high-pass filter, the roots cannot take some values. This eliminates directly some roots for R and consequently some candidates $h_i$.

If there are some symmetries, some roots are grouped and thus belongs either to H(z) or to G(z).

Moreover, the filter sizes $L_1$ and $L_2$ can be chosen shorter than their true values (i.e. the values of the filters to be estimated) to reduce the complexity if needed, as done in the Volterra approach.

In a step S45, the transmitter 10 sends a second pilot sequence x2 and the receiver 14 receives a second sequence w2. The second pilot sequence $x_2$ is defined such that its peak amplitude is higher than the peak amplitude of $x_1$. More precisely, $x_2$ is defined such that u=$x_2$*h has a high peak amplitude, i.e. such that u has a peak amplitude greater than μ or at least such that such that u exceeds μ with high frequency.

In a step S46, the non-linearity c(.) is determined and one candidate $h_i$ among the set of Nb candidates computed at step S42 is selected responsive to x2 and w2. Consequently, one gi is also determined since a unique gi corresponds to each candidate hi. This step is further detailed on FIG. 6.

The steps S42 to S46 may be implemented in the transmitter 10 or in the receiver 14.

In one embodiment, the receiver 14 knowing x1, x2, w1 and w2 implements the steps S42 to S46 to estimate h, c and g. Then, the receiver 14 may transmit estimated h, c and g to the transmitter 10 using a reliable return channel, or coefficients representing the predistortion function if applicable, said coefficients being obtained responsive to the estimated h, c and g. The transmitter 10 is then responsible for adapting the considered predistortion function f'( ) or selecting a predistortion function responsive to the estimated h, c and g. In this latter case, each predistortion function in the codebook is for example defined by a look-up table.

In a variant, in the case where a codebook of predistortion functions is used, the receiver 14 may select an appropriate pre-distortion function in the codebook responsive to the estimated h, c, g and then transmits to the transmitter 10 an index identifying the selected predistortion function.

In another variant, the receiver 14 estimate h, c and g and, then applies an equalization function whose weights are adapted responsive to the estimated h, c and g. The equalization function replaces the predistortion applied on the transmitter side.

In another embodiment, the receiver 14 transmits w1 and w2 back to the transmitter 10 using a reliable return channel. In this case, the transmitter 10 knowing x1, x2, w1 and w2 implements the steps S42 to S46 to estimate h, c and g and then adapts the predistortion function f'( ) from estimated h, c and g or select a predistortion function in a codebook of predistortion functions responsive to the estimated h, c and g. The transmitter 10 is then able to apply the pre-distortion function f'( ) on each signal to be transmitted.

In all embodiments, h, c and g may be estimated once and for all before any transmission of a relevant signal. In a variant, h, c and g may be re-estimated regularly. Each time h, c and g are estimated, the predistortion function is adapted or a new predistortion function is selected. In an embodiment, the sequences $x_1$ and $x_2$ may be uniquely defined in a standard.

Figure 4B:
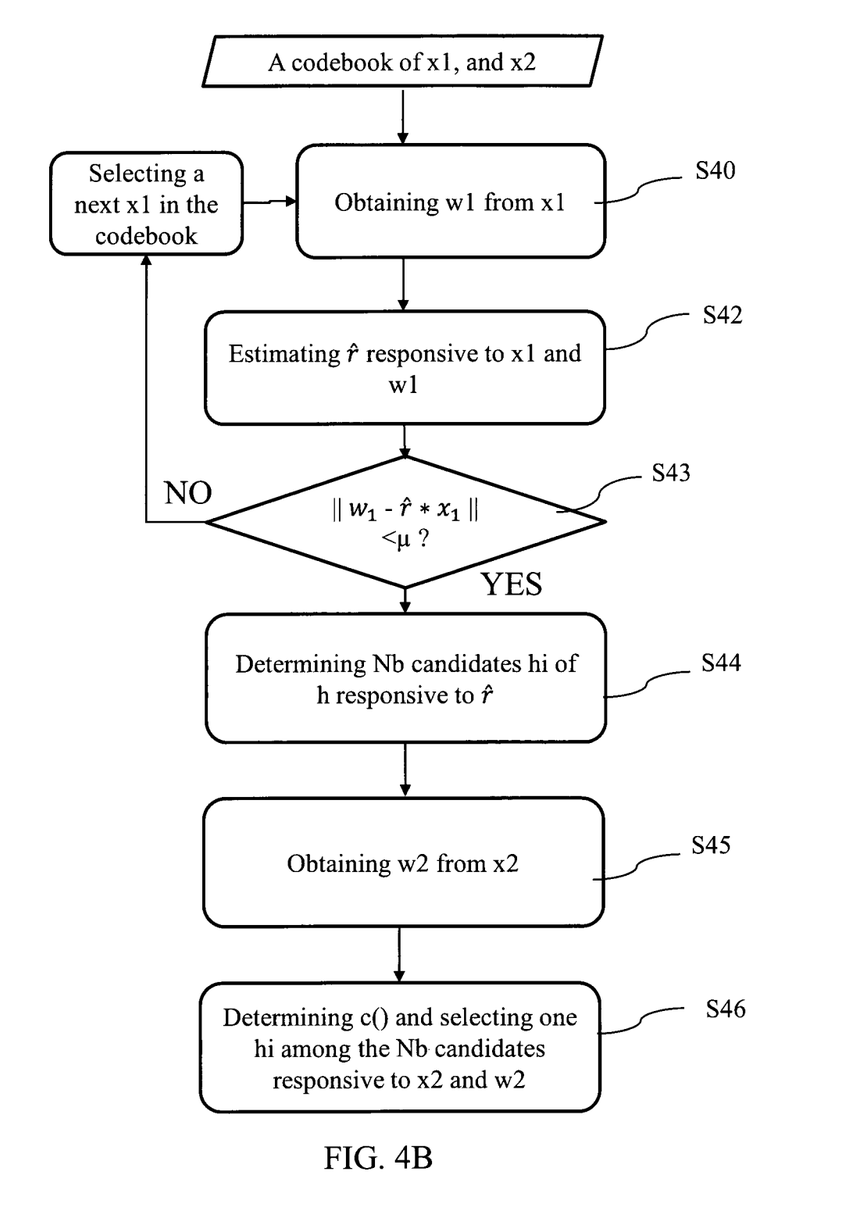
FIG. 4B depicts a method for estimating the linear filters and the nonlinear function of the Wiener-Hammerstein model according to another specific embodiment.

In a variant, illustrated by FIG. 4B, a plurality of sequences x1 may be defined in a standard, e.g. as a codebook, while the sequence x2 is fixed once and for all. The selection of one sequence x1 in the codebook (for estimating h, c g) may be done using a return path from the receiver 14 to the transmitter 10. The pilot sequences in the codebook are, for example, ordered in a transmission order defined a priori. The steps of FIG. 4B identical to the steps of FIG. 4A are identified with the same numeral references.

Steps S40 to S42 applies with a first sequence x1 of the codebook.

After S42, the receiver 14 compares, at step S43, an error $\|w_1 - \hat{f}^* x_1\|$ with a threshold value $\mu$. In the case where the error $\|w_1 - \hat{f}^* x_1\|$ is above the threshold value, the receiver 14 either requests the transmitter 10 to select and then send a next sequence x1 of the codebook or selects itself a next sequence x1 in the codebook and requests the transmitter 10 to send the selected pilot sequence x1 in order to obtain a corresponding w1.

The steps S40 to S42 are thus repeated until a sequence x1 is selected in the codebook whose error $\|w_1 - \hat{f}^* x_1\|$ is below the threshold value. This latter pilot sequence x1 is then used with x2 for estimating h, c and g.

In another variant, the receiver 14 sends the error $\|w_1 - \hat{f}^* x_1\|$ back to the transmitter 10. The transmitter 10 then selects a next pilot sequence x1 in the codebook and transmits the selected pilot sequence x1 to the receiver 14 to obtain a corresponding w1. The steps S40 to S42 are thus repeated until a sequence x1 is selected in the codebook whose error $\|w_1 - \hat{f}^* x_1\|$ is below the threshold value. This latter pilot sequence x1 is then used with x2 for estimating h, c and g.

Figure 6:
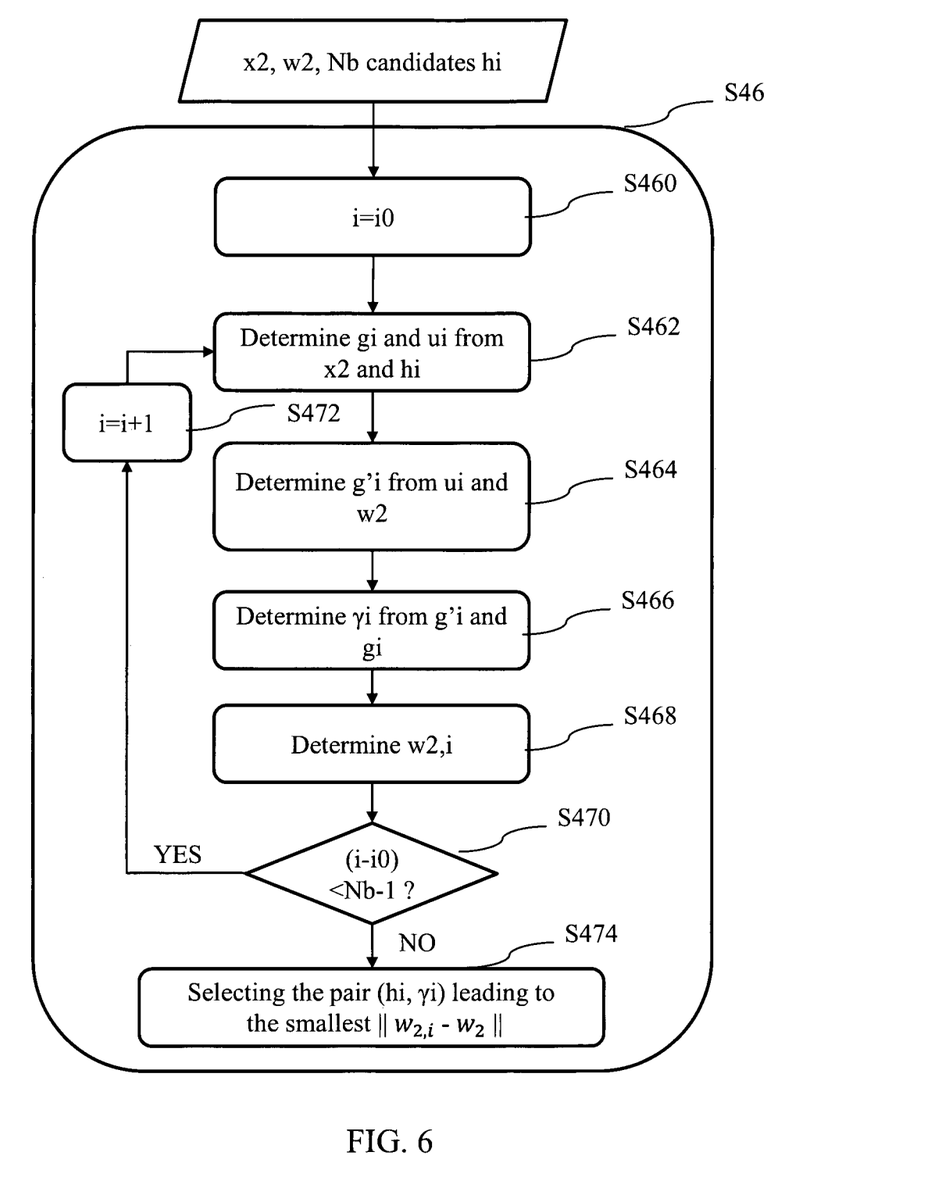
FIG. 6 depicts a flowchart detailing another step of the method of FIG. 4A or 4B according to a specific embodiment.

FIG. 6 depicts a flowchart detailing the step S46 of FIG. 4A or 4B according to a specific embodiment.

At a step S460, an index i is first initialized to a first value i0, e.g. i0=0.

At a step S462, a corresponding unique $g_i$ is computed from $h_i$. Indeed, $G(z) = R(z)/Z(h_i)$. As an example, in the case where $R(z) = (z-z1)(z-z2)(z-z3)(z-z4)$, once $H(z)$ is set to be equal to $(z-z1)(z-z2)$, then $G(z) = (z-z3)(z-z4)$. Therefore, the coefficients of the filter $g_i$ are [1; z3+z4; z3*z4]. Also, $u_i = x_2 * h_i$ is computed.

In the Hammerstein model, $w_2$ is obtained from $u_i$ as follows:

$$w_2(n) = \sum_j g_i(j) \left( \sum_k \gamma_i(k) u_i^k(n-j) \right) =$$

$$\sum_k \sum_j \gamma_i(k) g_i(j) u_i^k(n-j) = \sum_k \sum_j g_k'^i(j) u_i^k(n-j).$$

Therefore, at a step S464, the coefficients $g'^i$ of the Hammerstein model, i.e. c*g, are determined from the couple (ui, w2) via least square method as follows:

$$g'^i = \left( \phi(u_i)^H \phi(u_i) \right)^{(-1)} \phi(u_i)^H w_2,$$

where $\phi(u_i) = [u_i, u_i^2, \ldots, u_i^K]$.

At a step S466, the coefficients $\gamma_i(k)$ are then computed from $g'^i$ and $g_i$ by averaging the estimates as follows:

$$\gamma_i(1) = \left( \frac{g_1'^i(1)}{g_i(1)} + \ldots + \frac{g_1'^i(L_2)}{g_i(L_2)} \right) / L_2,$$

$$\gamma_i(K) = \left( \frac{g_K'^i(1)}{g_i(1)} + \ldots + \frac{g_K'^i(L_2)}{g_i(L_2)} \right) / L_2$$

At a step S468, the corresponding $w_{2,i}$ is computed with the estimated model (hi, $\gamma_i$) as follows: $w_{2,i} = c_i(x1 * hi) * gi$, where ci is defined from $\gamma_i$ by (Eq. 1).

At a step S470, (i–i0) is compared with Nb–1 in the case where (i–i0)<Nb–1, i is incremented by one at S472 and the method continues at S462. Otherwise, the method continues at S474.

At the step S474, the pair (hi, γi) leading to the smallest value $\|w_{2,i} - w_2\|$ is selected. After the step S474, h, g and c are thus completely defined. More precisely, h is the hi selected at step S474, g is the gi corresponding to the selected hi and c( ) is defined from the γi computed at step S466 and from (Eq. 1).

Figure 7:
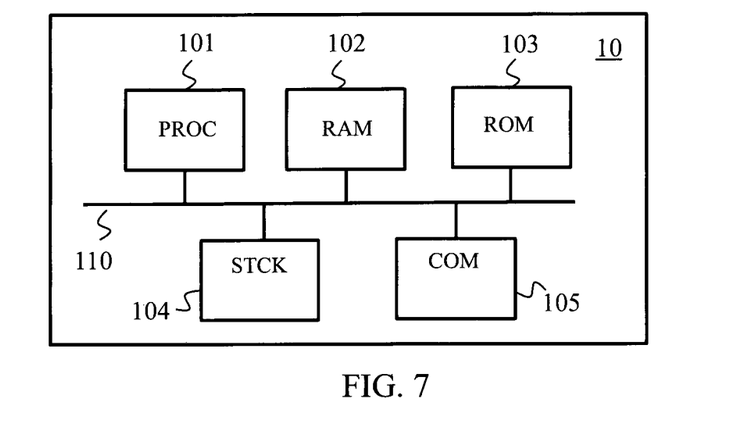
FIG. 7 illustrates schematically an example of hardware architecture of transmitter according to a specific embodiment.

FIG. 7 illustrates schematically an example of hardware architecture of a transmitter 10 according to a specific embodiment.

The transmitter 10 comprises, connected by a communication bus 110: a processor or CPU (acronym of "Central Processing Unit") 101; a random access memory RAM 102; a read only memory ROM 103; a storage unit 104 such as an hard disk or such as a storage medium reader, e.g. a SD (acronym of "Secure Digital") card reader; and at least one set of communication interfaces COM 105 enabling the transmitter 10 to transmit and receive data.

The processor 101 is capable of executing instructions loaded into the RAM 102 from the ROM 103, from an external memory (such as an SD card), from a storage medium (such as the HDD), or from a communication network. When the transmitter 10 is powered up, the processor 101 is capable of reading instructions from the RAM 102 and executing them. These instructions form a computer program causing the implementation, by the processor 101, of the methods described in relation to FIGS. 4A to 6.

The methods described in relation to FIGS. 4A to 6 may be implemented in software form by the execution of the set of instructions by a programmable machine, for example a DSP (acronym of "Digital Signal Processor"), a microcontroller or a GPU (acronym of "Graphics Processing Unit"), or be implemented in hardware form by a machine or a dedicated component (chip or chipset), for example an FPGA (acronym of "Field-Programmable Gate Array") or an ASIC (acronym of "Application-Specific Integrated Circuit"). In general, the transmitter 10 includes electronic circuitry adapted and configured for implementing the methods described in relation to FIGS. 4A to 6.

Figure 8:
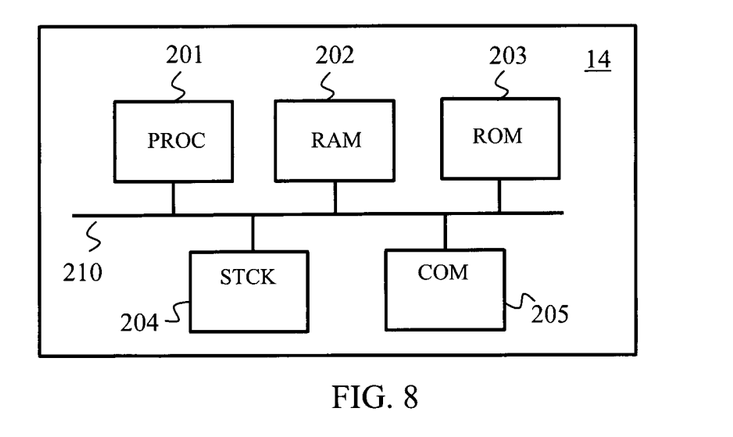
FIG. 8 illustrates schematically an example of hardware architecture of a receiver according to a specific embodiment.

FIG. 8 illustrates schematically an example of hardware architecture of a receiver 14 according to a specific embodiment.

The receiver 14 comprises, connected by a communication bus 210: a processor or CPU (acronym of "Central Processing Unit") 201; a random access memory RAM 202; a read only memory ROM 203; a storage unit 204 such as an hard disk or such as a storage medium reader, e.g. a SD (acronym of "Secure Digital") card reader; and at least one set of communication interfaces COM 205 enabling the receiver 14 to transmit and receive data.

The processor 201 is capable of executing instructions loaded into the RAM 202 from the ROM 203, from an external memory (such as an SD card), from a storage medium (such as the HDD), or from a communication network. When the receiver 14 is powered up, the processor 201 is capable of reading instructions from the RAM 202 and executing them. These instructions form a computer program causing the implementation, by the processor 201, of the method described in relation to FIGS. 4A to 6.

The method described in relation to FIGS. 4A to 6 may be implemented in software form by the execution of the set of instructions by a programmable machine, for example a DSP (acronym of "Digital Signal Processor"), a microcontroller or a GPU (acronym of "Graphics Processing Unit"), or be implemented in hardware form by a machine or a dedicated component (chip or chipset), for example an FPGA (acronym of "Field-Programmable Gate Array") or an ASIC (acronym of "Application-Specific Integrated Circuit"). In general, the receiver 14 includes electronic circuitry adapted and configured for implementing the method described in relation to FIGS. 4A to 6.

The invention claimed is:

1. A method in a communication system comprising a transmitter and a receiver communicating through a communication channel comprising a high power amplifier, wherein the communication channel is modeled as a succession of a first linear filter of size L1, a non-linear function and a second linear filter of size L2, L1 and L2 being positive integers, the method comprising:
   a) Obtaining a first received sequence w1 corresponding to the transmission of a first pilot sequence x1 by the transmitter to the receiver, the first pilot sequence being such that the output of the first linear filter obtained with the first pilot sequence as input has a low peak amplitude with respect to a saturation level of the high power amplifier, or a high peak amplitude with a low frequency;
   b) Estimating r responsive to the first pilot sequence x1 and the first received sequence w1, r being equal to the convolution of the first and the second linear filters;
   c) Determining a plurality of candidates for the first linear filter responsive to the estimated $\hat{r}$;
   d) Obtaining a second received sequence w2 corresponding to the transmission of a second pilot sequence x2 by the transmitter to the receiver, the second pilot sequence being such that the output of the first linear filter obtained with the second pilot sequence as input has a high peak amplitude with respect to the saturation level of the high power amplifier; and
   e) Determining the non-linear function and selecting one candidate for the first linear filter among the plurality of candidates responsive to the second pilot sequence x2 and the second received sequence w2, the second linear filter being uniquely determined from the selected one candidate for the first linear filter.

2. The method of claim 1, wherein the communication system is a satellite communication system and the high power amplifier is in a satellite transponder.

3. The method of claim 1, wherein the first pilot sequence belonging to a codebook of first pilot sequences, the method further comprises, after step b), comparing an error $\|w_1 - \hat{r} * x_1\|$ with a threshold value and going back to step a) with a next first pilot sequence of the codebook in the case where $\|w_1 - \hat{r} * x_1\|$ is above a threshold value and continuing to step c) otherwise.

4. The method according to claim 1, wherein estimating r responsive to the first pilot sequence x1 and the first received sequence w1 comprises determining $\hat{r}$ as follows using a least square method:

$$\hat{r} = (x_1^H x_1)^{(-1)} x_1^H w_1$$

where $x_1^H$ denotes the conjugate transpose of $x_1$.

5. The method according to claim 1, wherein determining a plurality of candidates for the first linear filter responsive to the estimated $\hat{r}$ comprises:
   transforming $\hat{r}$ into the z-domain into R(z);
   determining the roots of R(z); and
   factorizing R(z) into a plurality of products H(z)G(z), with each H(z) being a combination of L1 roots of R(z) among the roots of R(z), each H(z) corresponding to one candidate for the first linear filter.

6. The method according to claim 5, wherein, the non-linear function c( ) being defined as follows: $c(u_i(n)) = \sum_{k=1}^{K} \gamma(k) u_i^k(n)$, where K is a positive integer, determining the non-linear function and selecting one candidate for the first linear filter among the plurality candidates responsive to the second pilot sequence and the second received sequence comprises:
   for each candidate hi of the first linear filter:
      computing a corresponding second linear filter gi from H(z) and hi and computing ui=x2*hi, where * is a convolution operator;
      determining $g'^i$ using a least square method as follows:

$$g'^i = (\phi(u_i)^H \phi(u_i))^{(-1)} \phi(u_i)^H w_2,$$

where $\phi(u_i) = [u_i, u_i^2, \ldots, u_i^K]$;
   determining $\gamma_i$ from $g'^i$ and $g_i$ wherein for each integer j in the range [1;K]:

$$\gamma_i(j) = \left(\frac{g_j'^i(1)}{g_i(1)} + \ldots + \frac{g_j'^i(L_2)}{g_i(L_2)}\right)/L_2$$

computing $w_{2,i}$ from hi and $\gamma_i$ as follows: $w_{2,i}=c_i(x1*hi)*gi$;

selecting a pair (hi, γi) leading to a smallest value $\|w_{2,i}-w_2\|$.

7. A predistortion method comprising:
determining a first linear filter, a non-linear function and a second linear filter according to the method of claim 1; and
adapting a predistortion function from said first linear filter, said non-linear function and said second linear filter.

8. A transmitting method comprising predistorting a signal by applying a predistortion function before transmission, wherein the predistortion function is adapted according to the method of claim 7.

9. A non-transitory storage medium storing a computer program product comprising program code instructions that can be loaded in a programmable device, the program code instructions causing implementation of the transmitting method according to claim 8 when the program code instructions are run by the programmable device.

10. A non-transitory computer-readable medium storing a computer program comprising program code instructions, the program code instructions causing implementation of the transmitting method according to claim 8 when the program code instructions are read from the computer-readable medium and run by a programmable device.

11. A non-transitory storage medium storing a computer program product comprising program code instructions that can be loaded in a programmable device, the program code instructions causing implementation of the predistortion method according to claim 7 when the program code instructions are run by the programmable device.

12. A non-transitory computer-readable medium storing a computer program comprising program code instructions, the program code instructions causing implementation of the predistortion method according to claim 7 when the program code instructions are read from the computer-readable medium and run by a programmable device.

13. A non-transitory storage medium storing a computer program product comprising program code instructions that can be loaded in a programmable device, the program code instructions causing implementation of the method according to claim 1 when the program code instructions are run by the programmable device.

14. A non-transitory computer-readable medium storing a computer program comprising program code instructions, the program code instructions causing implementation of the method according to claim 1 when the program code instructions are read from the computer-readable medium and run by a programmable device.

15. A transmitter in a communication system comprising a receiver, the transmitter and the receiver communicating through a communication channel comprising a high power amplifier, wherein the communication channel is modeled as a succession of a first linear filter of size L1, a non-linear function and a second linear filter of size L2, L1 and L2 being positive integers, the transmitter being configured to:

a) Obtain a first received sequence corresponding to the transmission of a first pilot sequence by the transmitter to the receiver, the first pilot sequence being such that the output of the first linear filter obtained with the first pilot sequence as input has a low peak amplitude with respect to a saturation level of the high power amplifier or a high peak amplitude with a low frequency;
b) Estimate r responsive to the first pilot sequence and the first received sequence, r being equal to the convolution of the first and the second linear filters;
c) Determine a plurality of candidates for the first linear filter responsive to the estimated r̂;
d) Obtain a second received sequence corresponding to the transmission of a second pilot sequence by the transmitter to the receiver, the second pilot sequence being such that the output of the first linear filter obtained with the second pilot sequence as input has a high peak amplitude with respect to the saturation level of the high power amplifier; and
e) Determine the non-linear function and selecting one candidate for the first linear filter among the plurality of candidates responsive to the second pilot sequence and the second received sequence, the second linear filter being uniquely determined from the selected one candidate for the first linear filter.

16. A receiver in a communication system comprising a transmitter, the transmitter and the receiver communicating through a communication channel comprising a high power amplifier, wherein the communication channel is modeled as a succession of a first linear filter of size L1, a non-linear function and a second linear filter of size L2, L1 and L2 being positive integers, the receiver being configured to:

a) Obtain a first received sequence corresponding to the transmission of a first pilot sequence by the transmitter to the receiver, the first pilot sequence being such that the output of the first linear filter obtained with the first pilot sequence as input has a low peak amplitude with respect to a saturation level of the high power amplifier or a high peak amplitude with a low frequency;
b) Estimate r responsive to the first pilot sequence and the first received sequence, r being equal to the convolution of the first and the second linear filters;
c) Determine a plurality of candidates for the first linear filter responsive to the estimated r̂;
d) Obtain a second received sequence corresponding to the transmission of a second pilot sequence by the transmitter to the receiver, the second pilot sequence being such that the output of the first linear filter obtained with the second pilot sequence as input has a high peak amplitude with respect to the saturation level of the high power amplifier; and
e) Determine the non-linear function and selecting one candidate for the first linear filter among the plurality of candidates responsive to the second pilot sequence and the second received sequence, the second linear filter being uniquely determined from the selected one candidate for the first linear filter.

* * * * *